United States Patent

Blanchard et al.

[11] Patent Number: 6,138,013
[45] Date of Patent: *Oct. 24, 2000

[54] METHOD FOR LOCATION BASED INTERCEPT IN A COMMUNICATION SYSTEM

[75] Inventors: Scott David Blanchard, Mesa; Dean Paul Vanden Heuvel, Chandler; Pramodkumar Patel, Phoenix, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/022,829

[22] Filed: Feb. 12, 1998

[51] Int. Cl.⁷ .................................................. H04Q 7/22
[52] U.S. Cl. .................... 455/428; 455/13.1; 455/427; 379/34; 379/35
[58] Field of Search ...................... 455/427, 428, 455/430, 445, 12.1, 13.1, 456, 457, 440; 342/352, 353; 379/34, 35

[56] References Cited

U.S. PATENT DOCUMENTS

| | | | |
|---|---|---|---|
| 5,412,389 | 5/1995 | Olds | 342/357 |
| 5,428,667 | 6/1995 | Easterling et al. | 455/410 |
| 5,500,648 | 3/1996 | Maine et al. | 342/357 |
| 5,596,624 | 1/1997 | Armbruster | 379/58 |
| 5,724,660 | 3/1998 | Kauser et al. | 455/456 |
| 5,752,162 | 5/1998 | Sawyer et al. | 455/13.1 |
| 5,946,618 | 8/1999 | Agre et al. | 455/428 |

*Primary Examiner*—Fan Tsang
*Assistant Examiner*—Isaak R. Jama
*Attorney, Agent, or Firm*—Dana B. LeMoine; James E. Klekotka

[57] ABSTRACT

A method for providing location based intercept in a satellite communications system (10) includes the steps of determining a location area of a party (220), determining whether the location area is one to be monitored (240), and conditionally routing the call to an intercept gateway (250). An intercept gateway (32) is a gateway that intercepts all or part of the calls received, and can also function as a home gateway (30) or a visiting gateway (40).

5 Claims, 2 Drawing Sheets

6,138,013

METHOD FOR LOCATION BASED INTERCEPT IN A COMMUNICATION SYSTEM

FIELD OF THE INVENTION

This invention relates in general to the monitoring of users in communications systems and, in particular, to a method of routing calls to a designated intercept gateway in support of location-based intercept.

BACKGROUND OF THE INVENTION

Many communications systems have the ability to provide intercept services. Intercept services are services for intercepting calls and providing an eavesdropping capability. These services are typically used by law enforcement agencies (LEA) within their jurisdictions.

When a particular telephone line in a wireline telephony system is to be targeted for intercept, an indication of the line number is included in a list of numbers to be monitored. Similarly, within existing mobile telephony systems, a user number or telephone number is specified for intercept, and included with all such numbers. In prior art telephony systems, either wireline or mobile, intercept target lists are created and maintained manually in a controlled environment, and are subsequently loaded into the network switches. The intercept target lists typically include information describing the user to be monitored and the monitoring agency to which the monitored traffic should be delivered. When a call is placed through a network switch which has been loaded with an intercept target list, or when another appropriate event within the call process occurs, the switch queries the intercept target list to determine if any list member is involved in the call. If a user involved in the call is found in the list, the switch invokes a monitoring function which forwards the call to the appropriate monitoring agency. This prior art method of determining whether to intercept a call is herein identified as user-based intercept. In user-based intercept, the decision whether or not to intercept any call is based on the identity of either the calling party or the called party.

The party identity is typically given by what is referred to as the telephone number. This existing monitoring capability limits the intercept functionality such that it is only the telephone number which is used to perform the intercept determination.

A growing number of monitoring agencies desire to make call monitoring decisions based on criteria other than the identity of users or their associated telephone numbers. For example, sovereign entities may want to monitor all calls that emanate from, or terminate in, a certain location area or region. This type of intercept decision based on location is herein referred to as location-based intercept. Unfortunately, prior art switches supporting user-based intercept do not provide for location-based intercept. In order to provide intercept of all calls in any given area using existing switches and their associated intercept target lists, it would be necessary to include all users in the area in the intercept target list. This is not feasible because intercept target lists in switches are of a fixed size and cannot accommodate enough entries.

In order to accommodate intercept based on criteria other than user identities, new switches could be designed or current switches could be modified; however, this would be a very expensive solution to the problem. There is a large installed base of existing switches in communications systems today, and the cost of upgrading or replacing them all just to modify the intercept decision would be prohibitive. It would be desirable for existing switches to accommodate location-based intercept.

What is needed is a method and apparatus for providing location-based intercept with switches already having user-based intercept capability.

DETAILED DESCRIPTION OF THE DRAWINGS

Figure 1:
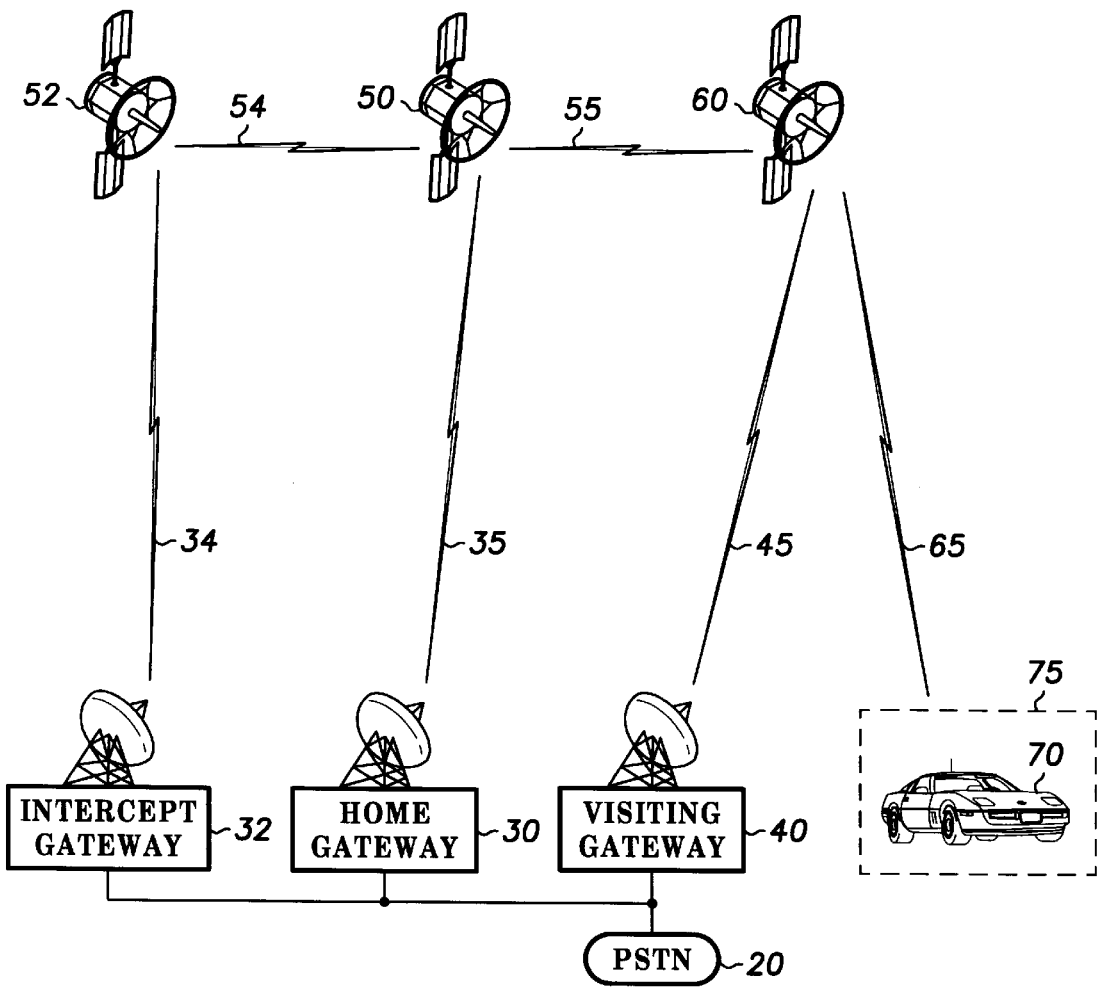
FIG. 1 shows a diagram of a satellite communications system in accordance with a preferred embodiment of the present invention.

Turning now to the drawings in which like reference characters indicate corresponding elements throughout the several views, attention is first directed to FIG. 1. FIG. 1 shows a diagram of a satellite communications system in accordance with a preferred embodiment of the present invention.

Satellite communications system 10 includes satellite 50, satellite 52, satellite 60, home gateway(HGW) 30, visiting gateway(VGW) 40, intercept gateway(IGW) 32, and public switched telephone network (PSTN) 20. Also shown in satellite communications system 10 are communications links 34, 35, 45, 54, 55, and 65, and user 70 within location area 75.

Satellites 50, 52, and 60 are preferably low earth orbit (LEO) satellites, but this is not a limitation of the present invention. In a preferred embodiment, satellites 50, 52, and 60 are part of a larger constellation of LEO satellites. In addition, the functionality of satellites 50, 52, and 60 can be combined into a single satellite while still practicing the present invention. For example, communications system 10 could include one or more geostationary (GEO) satellites that provide the functionality of satellites 50, 52, and 60.

HGW 30, IGW 32, and VGW 40 communicate with satellites 50, 52, and 60 via communication links 34, 35, and 45 as shown in FIG. 1. The satellites, in turn, communicate with mobile user 70 via communication link 65. The communication links in the exemplary embodiment of FIG. 1 show a single gateway communicating with a single satellite and a single satellite communicating with a single mobile user. In a preferred embodiment, IGW 32, HGW 30, and VGW 40 each communicate with multiple satellites, possibly simultaneously, and each satellite communicates with multiple mobile users. FIG. 1 shows that for mobile user 70 to communicate with HGW 30, the communication link includes two satellites. In another valid configuration of the network, the link between mobile user 70 and HGW 30 includes three or more satellites, and in still another valid configuration, only one satellite is needed. Multiple valid configurations also exist in the link between mobile user 70 and IGW 32, and between mobile user 70 and VGW 40.

One of many functions performed by HGW 30, IGW 32, and VGW 40 is to network the satellite communications system with PSTN 20. When a call is placed by mobile user 70, the call is routed through the satellite network to a gateway, and if the call is destined for a user in PSTN 20, the gateway routes the call to PSTN 20. If, on the other hand, the call is destined for another user within satellite communications system 10, the call may never be routed to PSTN 20. HGW 30, IGW 32, and VGW 40 can communicate using terrestrial links or using satellite communication links such as the path created by links 34, 35, 45, and 55. As will be described in more detail below, one service provided by satellite communications system 10 is call intercept. Calls placed by users such as mobile user 70 can be intercepted and forwarded to monitoring agencies. Routing of intercepted calls can be achieved through PSTN 20, or if the monitoring agency is a user of satellite communications system 10, the routing can be wholly provided within satellite communications system 10 without involving PSTN 20.

Location area 75 represents a geographical region on the surface of the earth. The shape of location area 75 is not important to the present invention. Satellite communications system 10 maintains information describing many location areas, possibly numbering in the millions. For exemplary purposes, only one such location area is shown in FIG. 1 as location area 75. Likewise, for exemplary purposes FIG. 1 shows a single mobile user, but communications system 10 preferably tracks many mobile users. Additionally, many mobile users can be within a single location area. An apparatus and method for tracking the location area of users is described in U.S. Pat. Nos. 5,412,389 and 5,500,648, issued May 2, 1995 and Mar. 19, 1996 respectively, the subject matter of which is hereby incorporated by reference.

An area that a monitoring agency wishes to monitor is termed a target intercept area. The target intercept area is related to location area 75 in that location area 75 is preferably smaller than the target intercept area. In a preferred embodiment, location area 75 is substantially smaller than the size of the target intercept area such that many location areas 75 fit within the target intercept area; however, in an alternate embodiment, location area 75 comprises the entire intercept area.

Location areas defined by satellite communications system 10 can be as small as allowed by the resolution of the system, or can be larger if high resolution is not needed. For example, if location-based intercept is provided for a sovereign nation so that all calls into or out of the country are to be intercepted, location determination can be somewhat coarse, at least in the interior of the country. The system can define location areas to be larger and still satisfy the requirements of the monitoring agency (in this case, a sovereign government).

Each mobile user is assigned a home gateway. One purpose of the home gateway is to track the location area of the mobile user and to provide billing services. Potentially, any gateway within satellite communications system 10 can function as a home gateway. In the exemplary embodiment shown in FIG. 1, mobile user 70 has home gateway HGW 30. When mobile user 70 is in the proximity of HGW 30 such that the routing of a communications signal to HGW 30 is more efficient than routing to any other gateway, then HGW 30 is the only gateway necessary for routing the communications signal. This corresponds to location area 75 being physically proximate to HGW 30. In contrast, if location area 75 is not physically proximate to HGW 30, such that a more efficient routing path is through a different gateway, such as VGW 40, then a communications signal from mobile user 70 will be routed through VGW 40 instead of HGW 30.

When mobile user 70 is accessing satellite communications system 10, HGW 30 determines the user's location area, and also determines which gateway will serve as a visiting gateway for the call. In the exemplary embodiment of FIG. 1 where the home gateway and the visiting gateway are different physical gateways, HGW 30 determines the location area 75 of mobile user 70 to be physically proximate to VGW 40. HGW 30 then sends a message to VGW 40 announcing that VGW 40 is to handle the call. This message is termed a visiting gateway assignment (VGA). The VGA preferably includes information identifying location area 75. In this way, VGW 40 handles the call from mobile user 70 and also has information describing location area 75 that corresponds to the physical location of mobile user 70.

It should be noted that in a preferred embodiment, calls are always handled by a visiting gateway, and for every call the home gateway sends a VGA. If mobile user 70 is physically proximate to his home gateway, the home gateway and the visiting gateway will be the same physical gateway. In this sense, the visiting gateway designation can be viewed as virtual. The virtual visiting gateway is assigned to a physical gateway, which can be the home gateway or any other gateway. The generation of VGA messages and the assignment of virtual gateways is described in U.S. Pat. No. 5,596,624, issued Jan. 21, 1997, the subject matter of which is hereby incorporated by reference.

IGW 32 is a gateway capable of routing calls in satellite communications system 10 in the same sense that HGW 30 and VGW 40 are gateways capable of routing calls in the system. In addition to the ability to route calls, IGW 32 has the ability to intercept calls routed through it. IGW 32 routes intercepted calls to their intended recipients as well as to a monitoring agency for eavesdropping. In a preferred embodiment, IGW 32 includes monitoring equipment for every line so that all calls routed by IGW 32 are intercepted; however, this is not a limitation of the present invention. In an alternate embodiment, IGW 32 does not intercept every call, but instead only intercepts a subset of calls routed.

Any number of intercept gateways can exist in satellite communications system 10. Preferably, satellite communications system 10 includes enough intercept gateways so that all intercept needs are met through the use of intercept gateways.

In a preferred embodiment, IGW 32 appears to satellite communications system 10 as any other gateway. That is, IGW 32 can be assigned to be a user's home gateway, or IGW 32 can be assigned to be a visiting gateway for call routing purposes. In this preferred embodiment, when IGW 32 receives a VGA assigning it to route a call, IGW 32 routes the call like any other visiting gateway, but additionally routes a copy of the call to a monitoring agency. Alternatively, IGW 32 can be allocated in such a manner that IGW 32 is not the home gateway for any users. In this mode, IGW 32 serves only users who are currently located in location area 75, allowing for each to be intercepted.

Any gateway that has the ability to create and send a VGA message can cause a call to be routed through IGW 32, and hence, to be intercepted. In a first embodiment, a user's home gateway sends a VGA to IGW 32, and in a second embodiment, a visiting gateway that has received a VGA for a call sends a VGA to IGW 32 for call routing. The first embodiment will now be described.

HGW 30 receives a call request when mobile user 70 attempts to place a call. HGW 30 then determines the location area 75 where mobile user 70 is located. HGW 30 generates a VGA and sends it to a physical gateway which is to be assigned as the visiting gateway. In the first embodiment, when the call is to be intercepted, HGW 30 generates a VGA for the call and sends it to IGW 32, thereby assigning IGW 32 as the visiting gateway responsible for routing the call. IGW 32 intercepts the call and routes it to its originally intended recipient.

HGW 30 can make the determination to route a call to IGW 32 using any of a number of criteria. For example, the location area where a mobile user resides can be used. If the location area is used as a discriminant to decide whether to intercept the call, location-based intercept services are provided. Of course, other discriminants can also be used, and they can also be combined. For example, HGW 30 can discriminate on the type of call such as data vs. voice, and on location area. This way, all data calls from a particular location area can be intercepted. Other discriminants include phone serial numbers in the form of international mobibile subscriber identity (IMEI), mobile identity number (MIN), or international mobile subscriber identity (IMSI). One skilled in the art will appreciate the possible permutations and combinations available for the intercept decision.

In a second embodiment, the visiting gateway makes the intercept decision and routes the call to IGW 32. When the visiting gateway receives a VGA, it queries the VGA to determine the location area of the user. If the location area is within a target intercept area, the visiting sends a VGA to IGW 32, thereby causing the call to be routed through a gateway that will automatically intercept the call. The visiting gateway can make the intercept determination based on any of a number of criteria. One possible criteria is the location area of the mobile user.

In all embodiments described thus far, a call request can be received for either a calling party or a called party. If the visiting gateway is handling a calling party making a call, then the location area included in the call request corresponds to the location area of the calling party. If, on the other hand, the visiting gateway is handling the call for the called party, the location area included in the call request corresponds to the location area of the called party. It can be seen then, that the method and apparatus of the present invention can function to provide intercept services for either calling parties or called parties.

Figure 2:
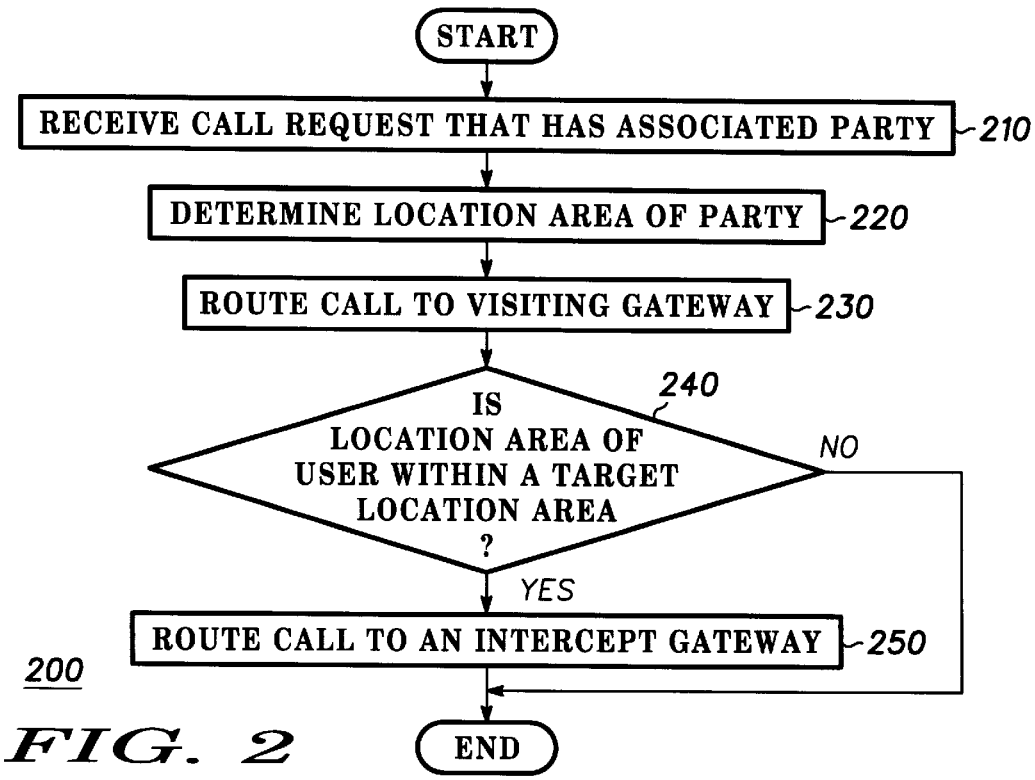
FIG. 2 shows a flowchart for a method of routing a call in a communications system in accordance with a preferred embodiment of the present invention.

FIG. 2 shows a flow chart for a method of routing a call in a communications system in accordance with a preferred embodiment of the present invention. Method 200 is a method for routing a call through a visiting gateway and an intercept gateway in support of location-based intercept. Method 200 begins with step 210 when a call request for a call is received, where the call has a party associated therewith. The party associated with the call request of step 210 can be a calling party or a called party. If a gateway is handling the routing for a calling party, then the party of step 210 is a calling party. In contrast, if a gateway is handling the routing for a called party, then the party associated with step 210 is a called party. The location area of the party of step 210 is determined in step 220. In the exemplary embodiment of FIG. 1, the party's location is included in the call request. In an embodiment where a home gateway and a visiting gateway are the same physical gateway, step 220 is performed when the home gateway physically determines the party's location.

After the party's location area is known, the home gateway routes the call to a visiting gateway in step 230. This is typically performed through the use of a VGA message which includes the location area information of the caller. Then, in step 240, the visiting gateway determines whether or not the location area of the user is within a target location area. Typically, the visiting gateway will query the VGA received for the location area of the user and then compare the location area with a database of location areas to be monitored.

When the location area is not one to be monitored, processing ends. When the location area is one to be monitored, the visiting gateway routes the call to an intercept gateway where the call will be intercepted.

Figure 3:
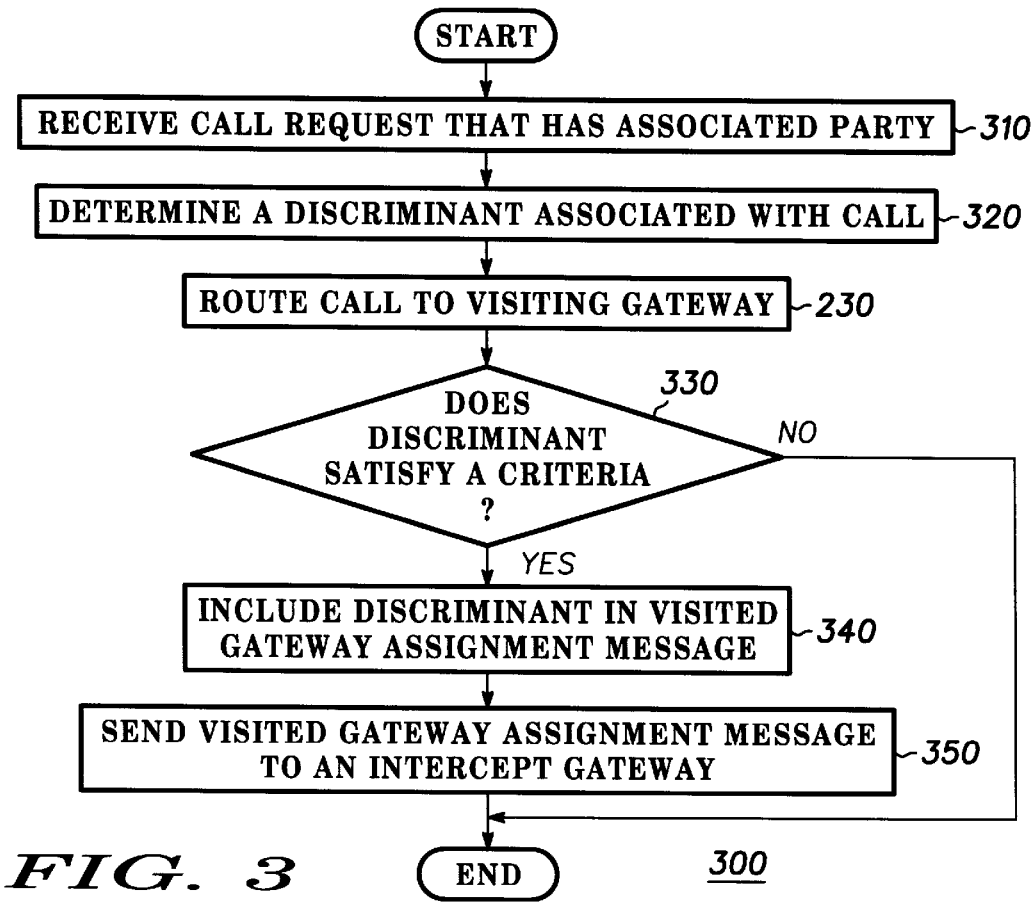
FIG. 3 shows a flow chart for a method of routing a call in a communications system in accordance with an alternate embodiment of the present invention.

FIG. 3 shows a flow chart for a method of routing a call in a communications system in accordance with an alternate embodiment of the present invention. Method 300 illustrates a more general method than that presented in FIG. 2. Method 300 begins with step 310 when a call request is received for a call that has a party associated therewith. Then in step 320, a discriminant associated with the call is determined. A typical discriminant is the location area of the user. Another typical discriminant is the user's identification in the form of a mobile systems integrated services digital network (MSISDN) number. Many other possible discriminants exist including the type of call such as voice vs. data. Step 320 can be performed by the home gateway for the party, or can be performed by another gateway in the satellite communications system 10 (FIG. 1). For each discriminant or set of discriminants, a criteria or set of criteria exist. Step 330 compares the discriminant against the criteria.

When, in step 330, the discriminant does not satisfy the criteria, processing ends. Otherwise, processing proceeds with step 340 where the discriminant is included in an VGA message. For a typical discriminant of location area, the location area of the party is included within the VGA message in step 340. After the discriminant is included in the VGA message, the VGA is sent to an intercept gateway in step 350.

In summary, the method and apparatus of the present invention provides an advantageous means for intercepting communications based on the location of the user(s). While we have shown and described specific embodiments of the present invention, further modifications and improvements will occur to those skilled in the art. For example, the specific embodiments described pertain mainly to telephony systems, but the method and apparatus of the present invention also apply to wideband systems, paging systems, and other data delivery services. Also for example, embodiments of the present invention have been described with respect to location-based intercept, but the method and apparatus of the present invention are also applicable to intercept based on other criteria such as type of call (data or voice), or mobile systems integrated services digital network (MSISDN) number. We desire it to be understood, therefore, that this invention is not limited to the particular forms shown and we intend in the appended claims to cover all modifications that do not depart from the spirit and scope of this invention.

What is claimed is:

1. A method of handling a call request in a satellite communications system, said satellite communications system comprising a plurality of gateways, at least one of said plurality of gateways being an intercept gateway, said intercept gateway being a gateway capable of intercepting all calls routed therethrough, said satellite communications system including enough intercept gateways so that all intercept needs are met using the intercept gateways, said method comprising the steps of:

a) determining a target location area;

b) establishing an intercept gateway for said target location area, said intercept gateway comprising means for intercepting all calls routed therethrough from or to said target location area;

c) receiving said call request for a call, said call having a calling party and a called party associated therewith;

d) determining a location area of said calling party;

e) comparing said location area of said calling party to said target location area;

f) when said location area of said calling party is within said target location area, routing said call to said intercept gateway for said target location area, wherein said intercept gateway for said target location area routes a copy of said call to a monitoring agency associated with said target location area, and routes said call to said called party, and when said location area of said calling party is not within said target location area routing said call to a virtual visiting gateway;

g) determining a location area of said called party;

h) comparing said location area of said called party to said target location area;

i) when said location area of said called party is within said target location area, routing said call to said intercept gateway for said target location area, wherein said intercept gateway for said target location area routes a copy of said call to a monitoring agency associated with said target location area, and routes said call to said called party; and j) when said location area of said called party is not within said target location area routing said call to said called party.

2. The method of claim 1 wherein steps c)–f) are performed by a home gateway.

3. The method of claim 1 wherein steps g)–j) are performed by said virtual visiting gateway.

4. The method of claim 1 wherein step c) further comprises the step of querying information included in said call request.

5. The method of claim 1 wherein step c) further comprises the step of determining when said call is a data call.

* * * * *